(12) United States Patent
Acker, Jr. et al.

(10) Patent No.: US 8,972,168 B2
(45) Date of Patent: Mar. 3, 2015

(54) TRACKING A MOBILE DEVICE

(71) Applicants: Joel Bennett Acker, Jr., Brush Prairie, WA (US); Richard Neil Cancro, Portland, OR (US); Douglas James Pedley, Portland, OR (US)

(72) Inventors: Joel Bennett Acker, Jr., Brush Prairie, WA (US); Richard Neil Cancro, Portland, OR (US); Douglas James Pedley, Portland, OR (US)

(73) Assignee: Wal-mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/722,876

(22) Filed: Dec. 20, 2012

(65) Prior Publication Data
US 2014/0180572 A1    Jun. 26, 2014

(51) Int. Cl.
*G01C 21/00*    (2006.01)
(52) U.S. Cl.
CPC ..................................... *G01C 21/00* (2013.01)
USPC ..... 701/410; 701/533; 455/456.1; 455/456.2; 455/456.3; 455/456.6; 709/217
(58) Field of Classification Search
USPC ......... 701/410, 533; 455/456.3, 456.1, 456.2, 455/456.6; 709/217
See application file for complete search history.

(56) References Cited

U.S. PATENT DOCUMENTS

| | | | |
|---|---|---|---|
| 6,659,344 B2 | 12/2003 | Otto | |
| 6,928,343 B2 | 8/2005 | Cato | |
| 7,463,147 B1 | 12/2008 | Laffoon | |
| 7,580,699 B1 | 8/2009 | Shaw | |
| 7,672,870 B2 | 3/2010 | Haines | |
| 7,734,513 B2 | 6/2010 | Bonner | |
| 8,207,851 B2 | 6/2012 | Christopher | |
| 8,326,315 B2 * | 12/2012 | Phillips et al. | 455/456.1 |
| 8,437,729 B2 * | 5/2013 | Ewell et al. | 455/404.1 |
| 8,441,351 B2 * | 5/2013 | Christopher | 340/568.1 |
| 8,467,768 B2 * | 6/2013 | Mahaffey et al. | 455/411 |
| 8,548,493 B2 * | 10/2013 | Rieger, III | 455/456.1 |
| 8,554,243 B2 * | 10/2013 | Klassen et al. | 455/456.1 |
| 2006/0047577 A1 | 3/2006 | Dietz | |
| 2008/0004042 A1 * | 1/2008 | Dietrich et al. | 455/456.1 |
| 2008/0026733 A1 * | 1/2008 | Jaatinen | 455/414.2 |
| 2008/0042836 A1 * | 2/2008 | Christopher | 340/568.1 |
| 2009/0005083 A1 * | 1/2009 | Hoshino et al. | 455/456.5 |
| 2009/0143079 A1 * | 6/2009 | Klassen et al. | 455/456.3 |
| 2012/0094688 A1 * | 4/2012 | Gravely et al. | 455/456.1 |
| 2012/0129553 A1 * | 5/2012 | Phillips et al. | 455/456.3 |
| 2012/0154146 A1 * | 6/2012 | Mohandes | 340/539.13 |
| 2013/0262223 A1 * | 10/2013 | Catane et al. | 705/14.53 |
| 2013/0324166 A1 * | 12/2013 | Mian et al. | 455/457 |

FOREIGN PATENT DOCUMENTS

EP    1874069 A1 *    1/2008
EP    2034735 A1 *    3/2009

* cited by examiner

*Primary Examiner* — Tuan C. To
(74) *Attorney, Agent, or Firm* — David R. Stevens; Stevens Law Group

(57) ABSTRACT

Embodiments for determining a route a consumer takes while traversing a retail store are disclosed. The embodiments include determining a store location of a retail store and a map corresponding to the layout of the retail store, receiving waypoint data including a plurality of positions within the map corresponding timestamps, determining a route in response to the waypoint data, and providing the route and the map for display.

20 Claims, 6 Drawing Sheets

TRACKING A MOBILE DEVICE

BACKGROUND INFORMATION

1. Field of the Disclosure

The present disclosure relates generally to systems and methods for tracking a mobile device. In particular, embodiments disclose tracking the movement of a consumer within a retail store via the mobile device.

2. Background

A consumer may visit buildings such as retail stores, supermarkets, and superstores to run errands, shop for products such as clothes, groceries, office supplies, household wares, and/or to purchase services.

While a consumer runs errands, the consumer may be required to put down various items such as their keys, mobile device, credit cards, etc. and/or rearrange the various items in their pockets, purse, wallet, etc. for various reasons. Further, the consumer may take off articles of clothing if they are trying on clothes in a department store. As such, situations may arise where the consumer misplaces, loses or forgets where they placed an item that they were carrying while running errands, and only realize that they do not have the item at a later time.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
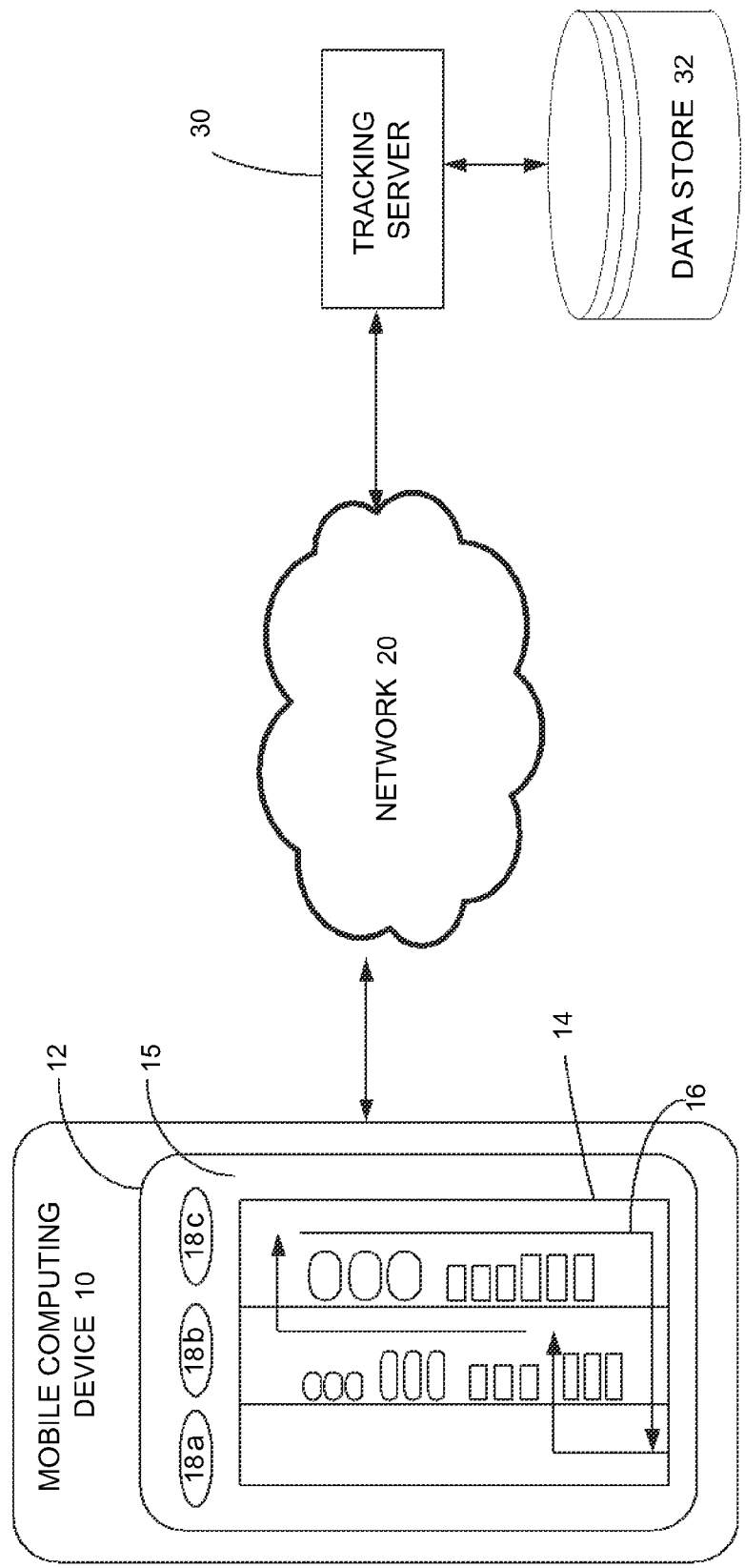
FIG. 1 depicts an example embodiment of a mobile computing device in communication with a tracking server via a network.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium. A consumer may carry a mobile computing device while running errands such as grocery shopping, visiting an auto-repair shop, purchasing office supplies, purchasing clothes or any other products sold by a retail store or having a service performed by the retail store. As used herein, the term "retail store" may refer to any business or a combination of businesses that sells and/or offers to sell products or services to a consumer. Examples of a retail store include grocery stores, malls, department stores, convenient stores, parking lots, etc.

Embodiments disclosed herein relate to tracking movements of a consumer in a retail store via a mobile computing device. The term "consumer" may refer to a person that enters a retail store. In particular, embodiments include determining a waypoint where a consumer enters a retail store, waypoints associated with the movements of the consumer within the retail store, and a waypoint where the consumer exits the retail store. As such, embodiments describe tracking a route a consumer takes while traversing a retail store.

Example embodiments for determining route may include determining a series of waypoints and corresponding time stamps associated with a position of a mobile computing device within a retail store, and storing the waypoints and timestamps in a repository. The waypoints and corresponding timestamps may be utilized to determine the route the consumer takes while in the retail store, and/or how long the consumer was at different waypoints within the retail store. To this end, if a consumer misplaces or loses an item within the retail store, the consumer may determine the route taken in the retail store and determine how long they spent at different waypoints. The consumer may retrace their route in the retail store or transmit the route to an employee of the retail store or another person who can retrace the route in the retail store to determine a waypoint of the misplaced or lost item. As used herein, the term "item" can refer to any type of product carried by a consumer such as clothes, keys, mobile computing device, wallet, purse, etc. An item can refer to a generic product or a specific product.

Referring now to FIG. 1, a mobile computing device 10 in communication with a tracking server 30 via a network 20 is depicted. Network 20 may be a wired or wireless network such as the Internet, an intranet, a LAN, a WAN, a cellular network or another type of network. It will be understood that network 20 may be a combination of multiple different kinds of wired or wireless networks.

Tracking server 30 may be a computing device such as a general platform server that is capable of supporting mobile applications. Tracking server 30 may include physical computing devices residing at a particular location or may be deployed in a cloud computing network environment. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Tracking service 30 may include any combination of one or more computer-usable or computer-readable media. For example, tracking server 30 may include a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations written in any combination of one or more programming languages. Tracking service 30 may include any combination of one or more computer-usable or computer-readable media.

Tracking server 30 may receive map information such as a map of a retail store, parking lot, mall, etc. associated with the retail store. As used herein, the term "map" may refer to map information that is a digital representation of the layout of a retail store. The map information may be a depicted as a map with boundaries for isles and walls, a grid reference system or a blank layout of a retail store. Tracking server 30 may also receive product information associated with retail products carried by the retail store and a location of the retail products within the map information. For example, tracking server 30 may receive the map and product information from the retail store, third party data services, etc. In response to receiving a map and product information, tracking server 30 may store the map and product information within data store 32.

Data store 32 may be a file store, memory or some other storage medium configured to store physical components to support a mobile application 15, such as components associated with a graphical user interface, map of a retail store, waypoints of products carried by the retail store, or a route module to determine a route that a consumer takes within a retail store.

Mobile computing device 10 may be a smart phone, tablet computer, laptop computer, personal data assistants or any other type of mobile device with a processor to process instructions and connect to network 20, one or more portions of network 20, tracking server 30, and/or any type of wireless signal that may assist in determining a waypoint of mobile computing device 10 within a retail store. Mobile computing device 10 may be configured to track the movements of a consumer carrying mobile computing device 10 in a retail store. Mobile computing device 10 may be configured to transmit and/or receive wireless waypoint data such as real-time locating system signals (RTLS), WiFi signals, GPS, Bluetooth, short range radio signals, etc. to determine the location of mobile computing device 10 and a corresponding time.

In an example embodiment, mobile computing device 10 may receive a timestamp corresponding to the time the mobile computing device 10 was positioned at the waypoint. As used herein the term "waypoint" can refer generally to a location in a retail store, e.g., a location of a product or an entrance. A waypoint can be represented in geographic coordinates, Cartesian coordinates, e.g., an (x, y) point if the store is divided into a Cartesian plane, and/or can be represented using reference points, e.g., "aisle 4, 50 feet from the front of the retail store." Mobile computing device 10 may transmit and/or receive waypoint data at a desired time interval, which may be a time period that is less than a second, every second, every five seconds, etc.

As shown in the illustrative example, mobile computing device 10 includes a graphical user interface (GUI) 12 displaying a map 14 of a retail store and a route 16 that a consumer takes within the retail store. Route 16 may be depicted as a continuous, hashed or dotted line identifying the waypoint of mobile computing device 10 within the retail store at different time periods. GUI 12 may overlay route 16 on map 14 of the retail store. GUI 12 may include a plurality of input objects which allow the consumer to provide commands to the mobile computing device 10. For example, GUI 12 may include an input 18a to begin tracking waypoints of mobile computing device 10, while it should be understood that the tracking waypoints of mobile computing device 10 may occur automatically or via commands received from tracking server 30 without any input from the consumer. GUI 12 may also include an input 18b to determine the style of map 14 that the consumer desires to display on GUI 12, however mobile application 15 or tracking server 30 may select the style of map 14 to be displayed on GUI 12 without any input from the consumer. GUI 12 may also include input 18c to select a retail store that the consumer is currently within or about to be within.

In an example embodiment, if mobile application 15 executes on mobile computing device 10, mobile computing device 10 may communicate with tracking server 30 over network 20. In response, tracking server 30 may transmit content associated with deploying, executing, and supporting mobile application 15 on mobile computing device 10. Mobile application 15 may receive content for presentation to a consumer on a display of mobile computing device 10, or be used in other functionality performed by mobile application 15 on mobile computing device 10. Mobile computing device 10 may transmit waypoint data associated with mobile computing device 10 to tracking server 30 along with the corresponding timestamps. Tracking server 30 may store the waypoint data along with the timestamp in an entry within data store 32. In an example embodiment, mobile computing device 10 may locally store the waypoint data and timestamps in a locally connected data store.

Figure 2:
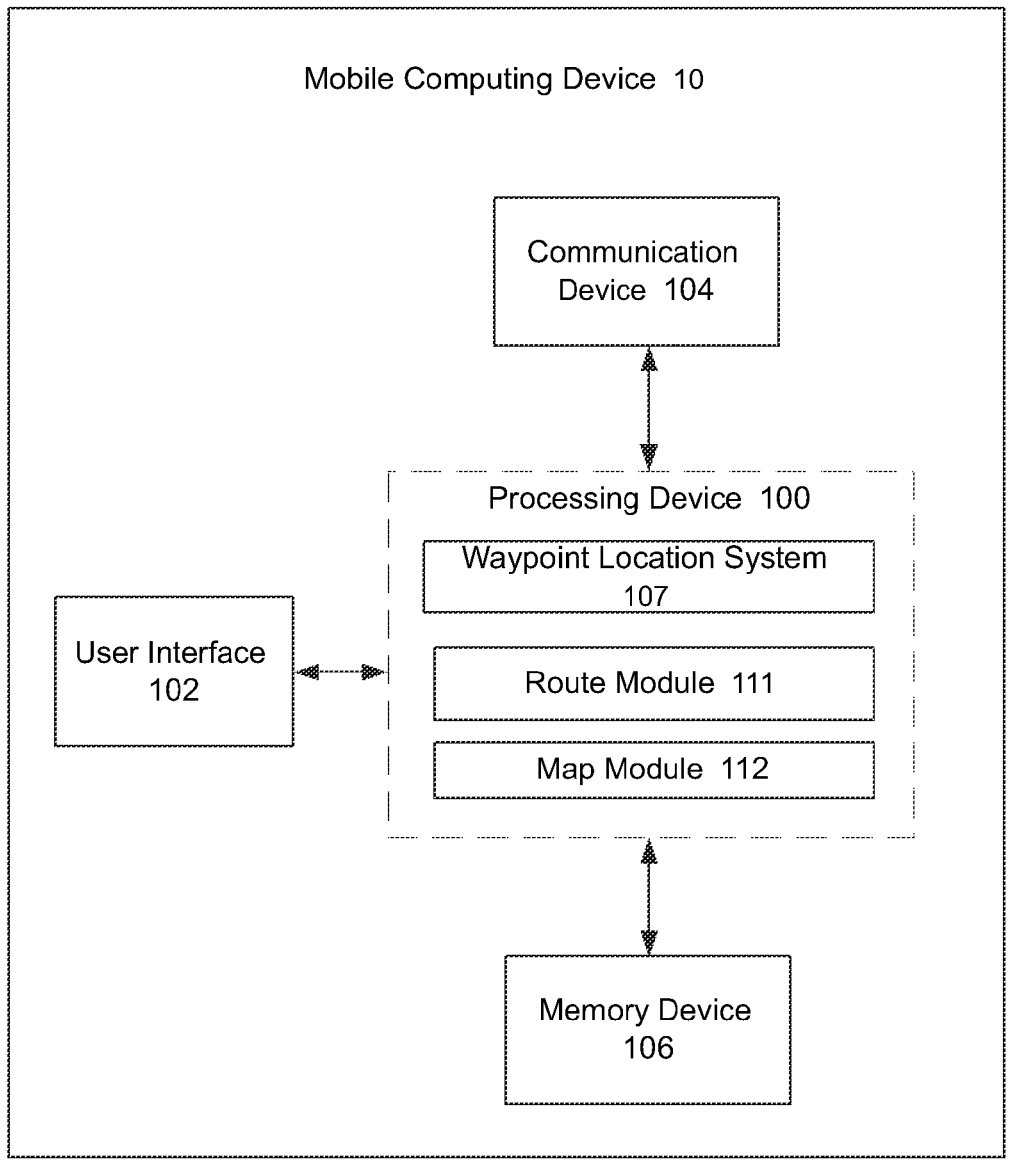
FIG. 2 depicts an example embodiment of example components of a mobile computing device.

Referring now to FIG. 2, example components of mobile computing device 10 of FIG. 1 is depicted. In the illustrative embodiment, mobile computing device 10 includes a processing device 100, GUI 12, a communication device 104, and a memory device 106. It is noted that the mobile computing device 10 can include other components and some of the components are not required.

Processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the mobile computing device 10. In the illustrative embodiment, the processing device 100 also executes waypoint location system 107, route module 111 and a map module 112, which are described in greater detail below.

Communication device 104 is a device that allows mobile computing device 10 to communicate with another device, e.g., tracking server 30, via the network 20. Communication device 104 can include one or more wireless transceivers for performing wireless communication and/or one or more communication ports for performing wired communication.

Memory device 106 is a device that stores data generated or received by the mobile computing device 10. Memory device 106 can include, but is not limited to, a hard disc drive, an optical disc drive, and/or a flash memory drive.

Waypoint location system 107 determines a waypoint of the mobile computing device 10 within a retail store via any known means, such as a RTLS WiFi, radar, mobile phone tracking, time distance of arrival (TDOA) signals, short wave radio, Bluetooth, etc. Waypoint location system 107 can perform known triangulation techniques to determine the current waypoint of the mobile computing device 10, and store data associated with the current waypoint in memory device 106. It should be appreciated that while waypoint location system 107 is shown, any other suitable component for determining the location of the mobile computing device 10 can be implemented. In one example embodiment, waypoint location system 107 may be configured to transmit and receive waypoint signals to transceivers positioned throughout a retail store. In response to transmitting waypoint signals to the transceivers, waypoint location system 107 may receive waypoint data to determine the current waypoint of mobile computing device 10. In another embodiment, transceivers may autonomously transmit waypoint data to waypoint location system 107. Waypoint location system 107 may transmit and/or receive waypoint data at any desired or required time interval. In an example embodiment, waypoint location system 107 may receive waypoint data identifying a current waypoint of mobile computing device 10 and a timestamp identifying the time that mobile computing device 10 was at the waypoint. Waypoint location system 107 may store the waypoint data and corresponding timestamp within memory device 106 and/or transmit this data to tracking server 30.

Route module 111 may be configured to determine a route a consumer transporting mobile computing device 10 takes while inside a retail store in response to the waypoint data. In an example embodiment, a route may include a waypoint where mobile computing device 10 enters a retail store, different waypoints within the retail store, and the waypoint where mobile computing device 10 exits the retail store. Route Module 111 may determine a length of time that the consumer was at waypoint along the route within the retail store in response to the waypoint data and corresponding timestamps. Route module 111 may be configured to determine the route between waypoint data by extrapolating data from different waypoint data to estimate the route.

Map module 112 may be configured to display map data associated with a map of the retail store on GUI 12. In one embodiment, map module 112 may receive a map of a retail store from tracking server 30 or third party data services. Map module 112 may store the location and map of the layout of one or more retail stores in a map database. Map module 112 may query the map database using a waypoint of mobile computing device 10, e.g., RTLS coordinates, or a general location, e.g., postal zip code or city/state, and determine a retail store where mobile computing device 10 is located and the corresponding map of the layout of the retail store. Map module 112 may be configured to overlay the route of mobile computing device 10 within the retail store on a map. The consumer may view the route on GUI 12. The route may include indicators associated with the length of time the consumer was at different waypoints within the retail store. The indicators may be different color route segments where different colors or line styles correspond to different lengths of time, symbols indicating where a consumer stops for a period of time greater than a time threshold, etc.

Figure 3:
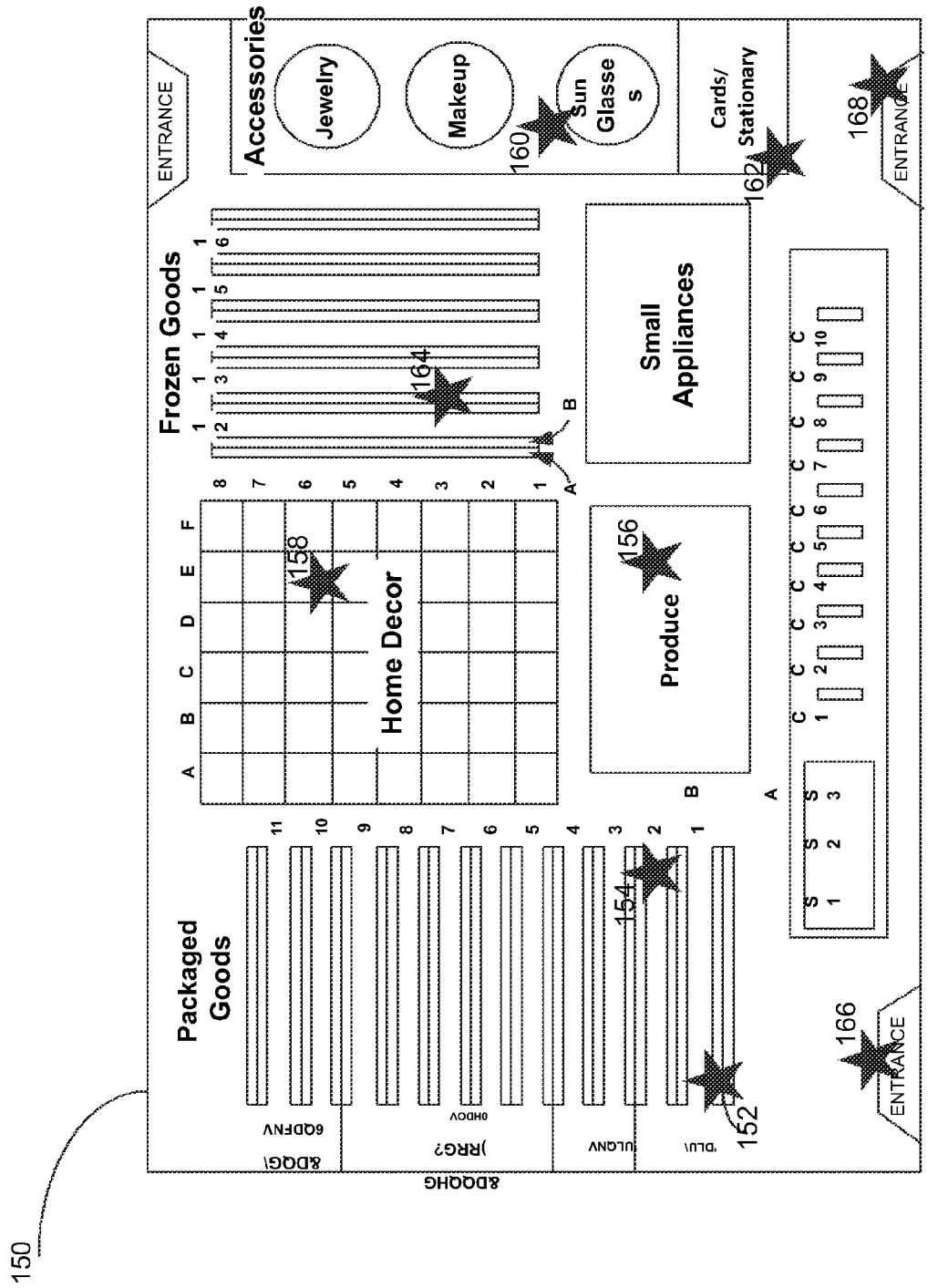
FIG. 3 depicts an example embodiment of a map corresponding to the layout of a retail store.

Referring to FIG. 3, an example of a map 150 corresponding to the layout of a retail store is depicted. Map module 112 may be configured to display map 150 to a consumer via GUI 12. It is noted that the example map 150 is provided for example and not intended to be limiting.

In the illustrated example, waypoints 152-164 where a consumer stops to view products for a period of time greater than a time threshold are displayed as graphical icons, e.g., stars. Map 150 includes a first waypoint 152 (e.g., location of "milk") and a second waypoint 154 (e.g., location of "cheese") in the dairy section. Additionally, the map 150 includes a third waypoint 156 (e.g., location of "lettuce") in the produce section, a fourth waypoint 158 (e.g., location of "curtains") in the home decor department, a fifth waypoint 160 (e.g., location of "sunglasses") in the clothing department, and a sixth waypoint 162 (e.g., location of "HALL-MARK® card") in the cards/stationary department. Furthermore, the map 150 includes a seventh waypoint 164 (e.g., location of "ice cream") in the frozen goods section. In example embodiments, the graphical icons representing waypoints 152-168 can be displayed on map 150 in varying sizes to indicate the relative amount of time that a consumer spends at different waypoints 152-168. Furthermore, map 150 may also display an entrance waypoint 166 and/or an exit waypoint 168. The entrance waypoint 166 may indicate a waypoint where the consumer enters the retail store. The exit waypoint 168 may indicate a waypoint where the consumer exits the retail store.

Figure 4:
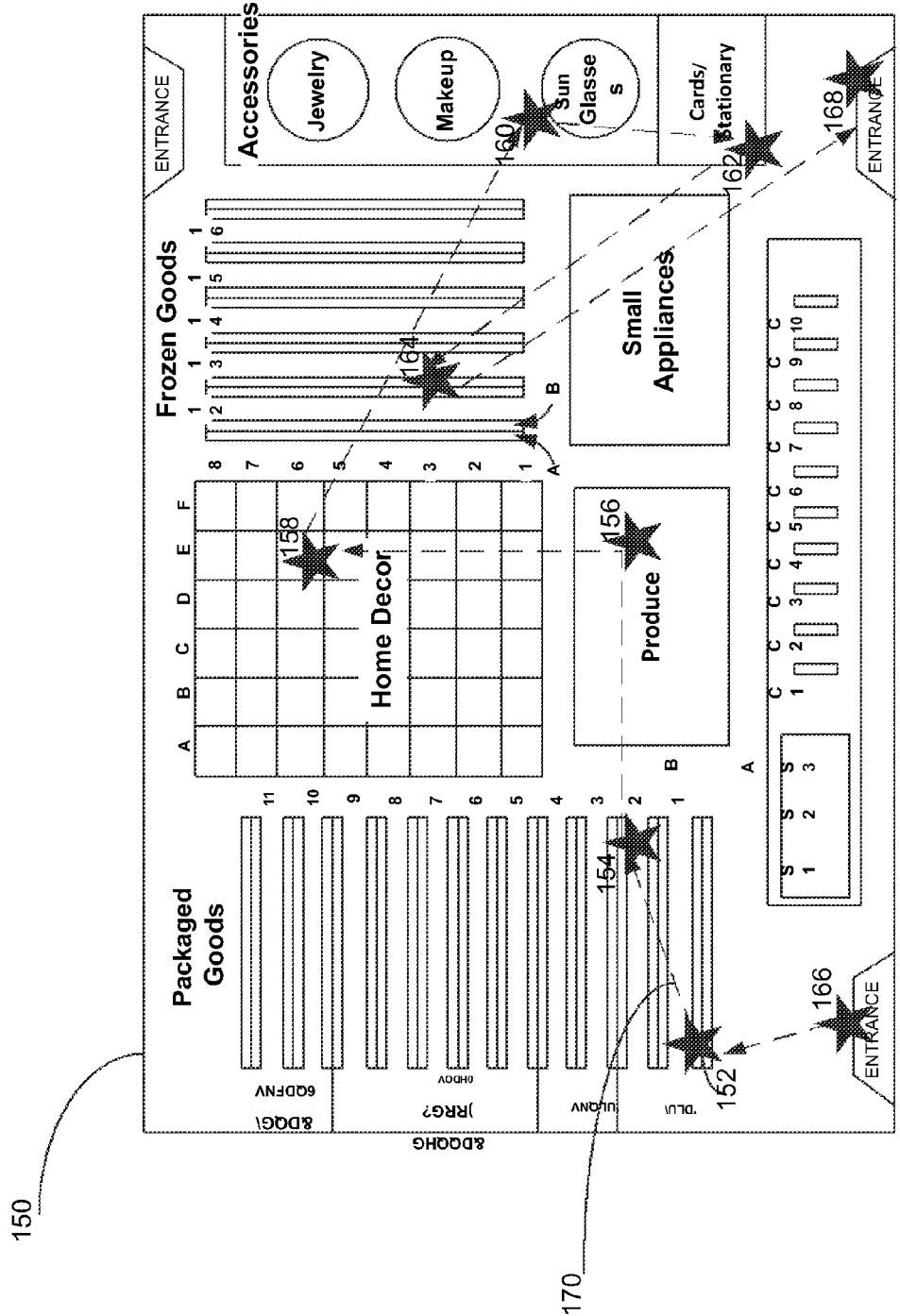
FIG. 4 depicts an example embodiment of a map having a route displayed therein.

FIG. 4 depicts one embodiment of map 150 having a route 170 displayed therein. It is noted that in example embodiments, map module 112 can be configured to receive map 150, waypoints 152-168, and route 170 and render route 170 and waypoints 152-168 on GUI 12.

Route 170 may be the route that a consumer operating mobile computing device 10 takes within the retail store. In the illustrated example, route 170 begins at entrance waypoint 166 and continues through first waypoint 152, second waypoint 154, third waypoint 156, fourth waypoint 158, seventh waypoint 165, fifth waypoint 160, sixth waypoint 162, and exit waypoint 168. In other embodiments, waypoints 152-168 may not be displayed and/or route 170 may be displayed as a continuous line, dotted line, etc.

Route 170 and waypoints 152-168 may be used by a consumer or another person to determine route 170 that the consumer takes while traversing the retail store. Situations may arise where a consumer using mobile computing device 10 misplaces or loses an item within the retail store, and only realizes that they have lost the item at a later point in time. For example, a consumer may try on sunglasses while at waypoint 160. While trying on sunglasses at waypoint 160, the consumer may put down an item such as a wallet, keys, or sunglasses they entered the store with. After trying on the sunglasses at waypoint 160, the consumer may forget to retrieve the item. At a later point in time, the consumer may realize that they no longer have the item, return to the store, and follow route 170 on the map 150 to determine where they put down the item. The consumer may extrapolate data to determine where is the most likely place they put down the item without following the entire route 170. For example, the consumer may realize that they have lost their sunglasses, and it is most likely that their sunglasses are somewhere near waypoint 160 where they were trying on other sunglasses. In other example embodiments, the consumer may be able to determine which waypoints of the retail store that they spent the most time at, and search only those portions of the retail store.

In example embodiments, the consumer may not be able to or may not desire to return to the retail store to locate and/or retrieve the item. Mobile computing device 10 may transmit map 150, route 170, and an alert to another device indicating that the consumer has lost an item within the retail store. In an example embodiment, a consumer may interface with mobile computing device 10, select a waypoint that is the most likely location where they lost the item, and transmit an alert including the waypoint to another device. In other embodiments, the alert may also include text describing the item, the timestamps identifying the times the consumer was at waypoints in the retail store, and a waypoint where the item may have been lost, along with any other information that may be helpful. An associate of the retail store or any other person may view route 170 on a display and retrace route 170 to determine where the item was lost or misplaced. The associate may push a notification to mobile computing device 10 indicating that they found the item. In an example embodiment, the notification may include a waypoint where the item was found, a description of the item and/or a picture of the item. The consumer may then confirm that the item found is the item that they lost.

Figure 5:
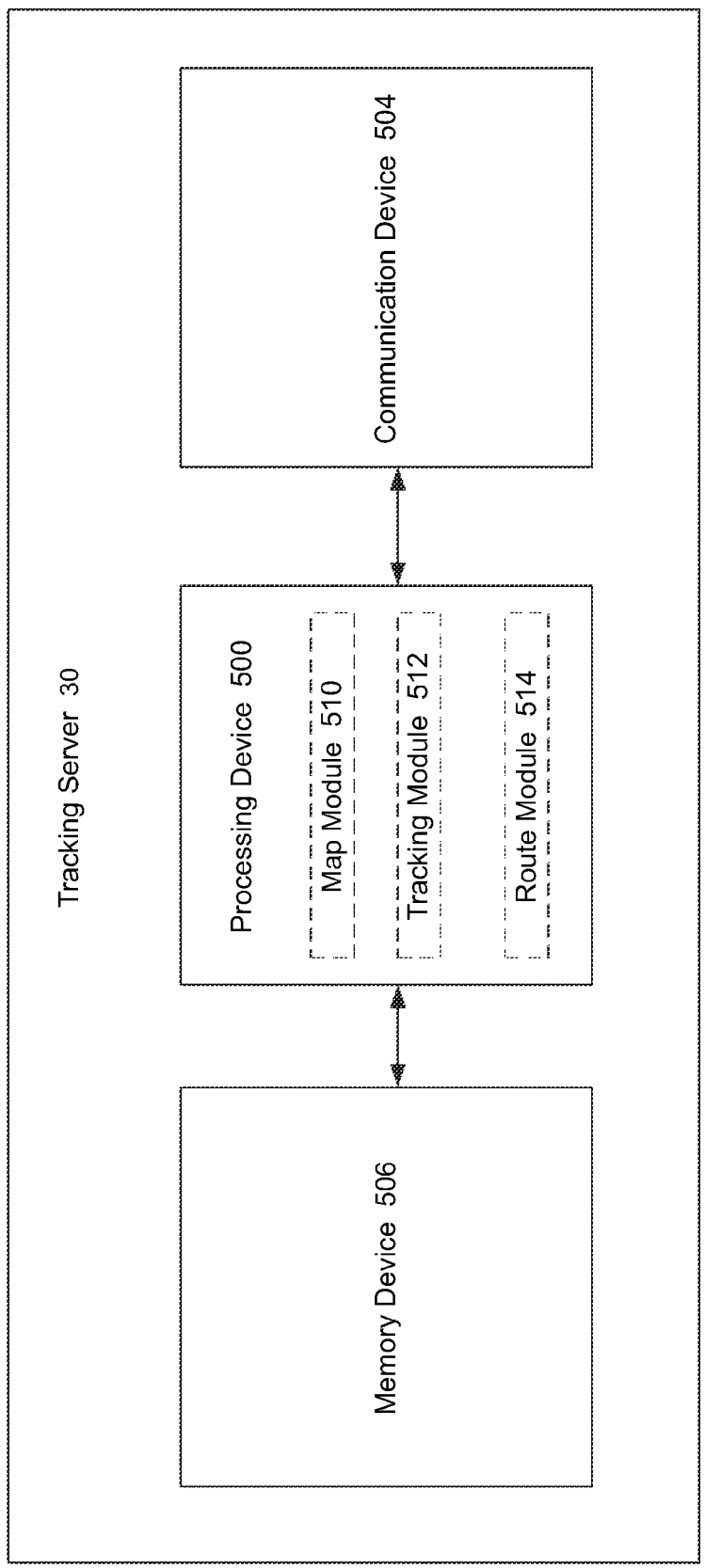
FIG. 5 depicts an example embodiment of a tracking server configured to perform one or more requested functions.

FIG. 5 illustrates components of tracking server 30 configured to perform one or more of the requested functions from mobile computing device 10. In the illustrated embodiment, tracking server 30 may include a processing device 500, a communication device 504, and memory device 506.

Processing device 500 can include memory, e.g., read only memory (ROM) and random access memory (RAM), storing processor-executable instructions and one or more processors that execute the processor-executable instructions. In embodiments where processing device 500 includes two or more processors, the processors can operate in a parallel or distributed manner. In the illustrative embodiment, processing device 500 executes map module 510, a tracking module 512, and route module 514.

Communication device 504 is a device that allows tracking server 30 to communicate with another device, e.g., the mobile computing device 10, via the network 20. Communication device 504 can include one or more wireless transceivers for performing wireless communication and/or one or more communication ports for performing wired communication.

Memory device 506 is a device that stores data generated or received by tracking server 30. Memory device 506 can include, but is not limited to a hard disc drive, an optical disc drive, and/or a flash memory drive. Further, memory device 506 may be distributed and located at multiple locations. Memory device 506 is accessible to the processing device 500. In embodiments, memory device 506 may be configured to store information associated with map module 510, tracking module 512, and route module 514.

Map module 510 may be configured to obtain maps corresponding to the layout of retail stores. Map module 510 may receive a map of a retail store from a plurality of sources such as the retail store itself, a partner of a retail store, the internet, or any other source of map information. In some embodiments, map module 510 includes maps that include a specific layout of a retail store including product placement indicators, size of different departments, and/or isles of the retail store. Map module 510 may also be configured to receive maps that only have a limited layout of the retail store including the positioning of the walls of the retail store.

Tracking module 512 may be configured to transmit and/or receive waypoint data identifying a location of mobile computing device 10 within a retail store at a various time periods. The waypoint data may include the coordinates of mobile computing device 10 and a corresponding timestamp.

Route module 514 may be configured to determine a route a consumer takes while inside a retail store in response to the waypoint data and corresponding timestamps. In one example embodiment, route module 514 may determine a route if mobile computing device 10 enters the retail store, is positioned at different waypoints within the retail store, and where the mobile computing device 10 exits the retail store. Route module 514 may determine the route between waypoint data by extrapolating data from other waypoint data. In an example embodiment, route module 514 may determine a length of time the consumer was at different waypoints within the retail store in response to the waypoint data and corresponding timestamps.

Figure 6:
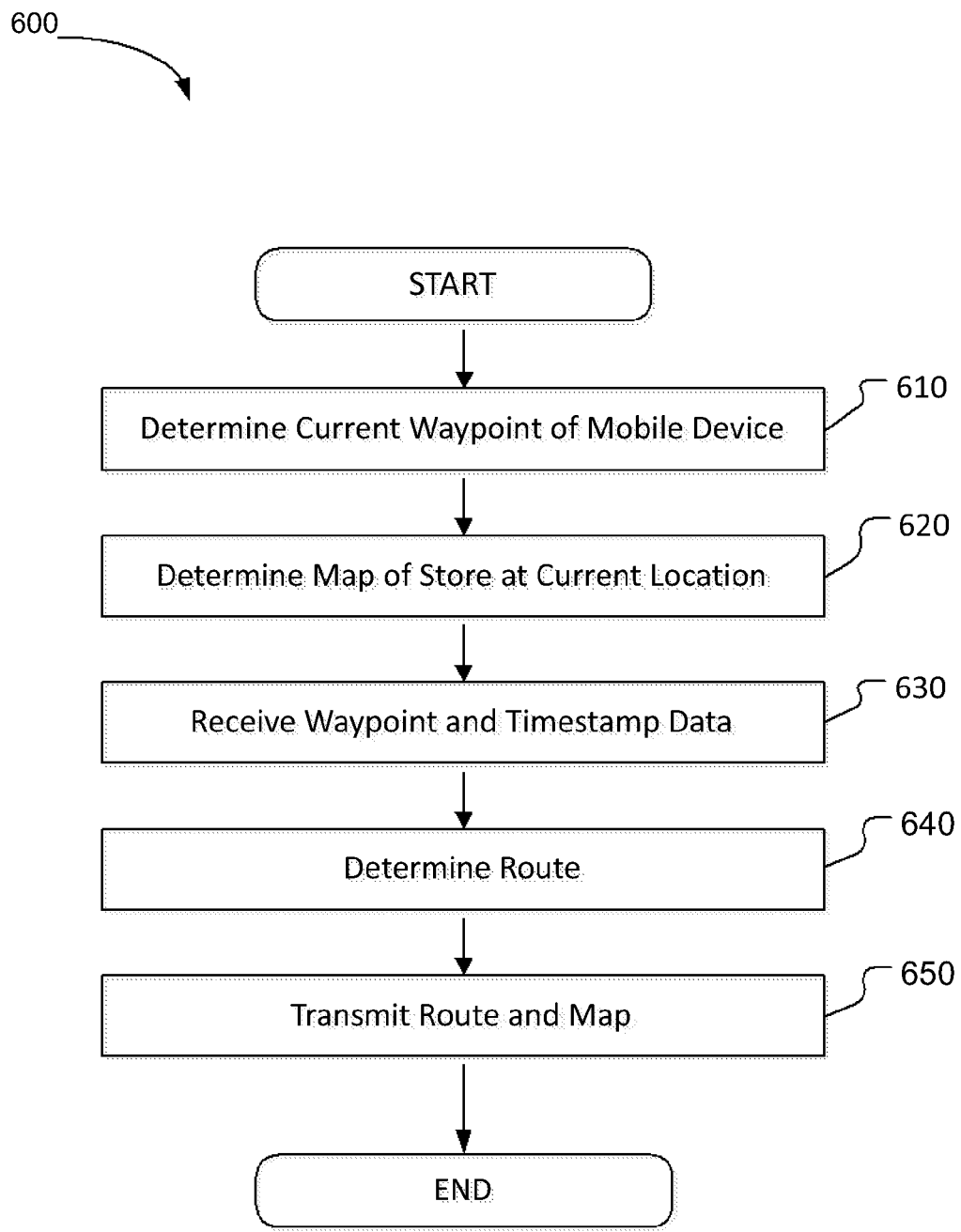
FIG. 6 depicts an example method for determining a route within a retail store.

Referring now to FIG. 6, an example method 600 for determining a route a consumer takes within a retail store is illustrated. In the illustrated example, the method 600 is executed by the processing device of tracking server 30. It is noted that method 600 may be modified such that the method 600 can be executed by processing device 100 of mobile computing device 10.

At operation 610, a processor of tracking server 30 may determine a current location of mobile computing device 10 to determine a retail store that mobile computing device 10 is entering or has already entered. In example embodiments, tracking service 30 may receive the waypoint of mobile computing device 10 determine what retail store is in closest proximity to mobile computing device 10. If tracking server 30 cannot determine what retail store mobile computing device 10 is entering or has entered, tracking server 30 may transmit data to be displayed on GUI 12 of mobile computing device 10 requesting a consumer select the retail store that they desire to enter or has entered.

At operation 620, map module 510 may query a map database to determine a map for the retail store that mobile computing device 10 is about to enter or has already entered. Map module 510 may transmit data to mobile computing device 10 to render an image associated with a map of the retail store on mobile computing device 10.

At operation 630, tracking module 512 may be configured to receive waypoint data identifying a waypoint of mobile computing device 10 within a retail store and a corresponding timestamps.

At operation 640, route module 514 may be configured to determine a route a consumer takes while inside a retail store in response to the waypoint data and corresponding timestamps. In one embodiment, route module 514 may determine a length of time the consumer is waypoints within the retail store.

At operation 650, tracking server 30 may transmit the route and the map of the retail store to mobile computing device 10. Mobile computing device 10 can render the route superimposed on the map.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented method comprising:
    determining, at a processing device, a store location of a retail store and a map corresponding to a layout of the retail store;
    receiving, at the processing device, waypoint data including a plurality of positions within the map and timestamps corresponding to the waypoint data;
    determining, at the processing device, a route in response to the waypoint data;
    providing, at the processing device, the route and the map for display;
    determining a position of the plurality of positions that is selected by a customer, the position indicating a location where an item associated with the customer has been lost in the retail store; and
    transmitting a notification including the position, the route, and the map to a computing device associated with the retail store to notify the retail store that the item has been lost.

2. The computer-implemented method of claim 1, wherein determining the route includes extrapolating data associated with the plurality of positions within the map and the corresponding timestamps to determine an estimated position.

3. The computer-implemented method of claim 1, wherein the plurality of positions and the timestamps are received at repetitive intervals.

4. The computer implemented method of claim 1, wherein the route is superimposed on the map.

5. The computer implemented method of claim 1, wherein the route is associated with a path that a consumer takes while traversing the store location.

6. The computer implemented method of claim 5, wherein the route includes indicators corresponding to how long the consumer was at a specific position in response to the timestamps.

7. The computer implemented method of claim 1, further comprising:
    providing, at the processing device, the route and the map to a device that is not associated with the received waypoint data.

8. The computer implemented method of claim 1, further comprising:
    receiving, at the processing device, a position on the route where an item was lost.

9. A server comprising:
    a map module configured to determine a store location of a retail store and a map corresponding to a layout of the retail store;
    a tracking module configured to receive waypoint data including a plurality of positions within the map and timestamps corresponding to the waypoint data;
    a route module configured to determine a route in response to the waypoint data; and
    a processor configured to:
        provide the route and the map over a network connection for display on a graphical user interface;
        determine a position of the plurality of positions selected by a customer, the position indicating a location where an item associated with the customer has been lost in the retail store; and
        receive a notification including the position of the plurality of positions, the route, and the map, the position indicating a location where an item associated with a customer has been lost in the retail store.

10. The server of claim 9, wherein the route module is further configured to determine the route by extrapolating data associated with the plurality of positions within the map and the corresponding timestamps to determine an estimated position.

11. The server of claim 9, wherein the plurality of positions and the timestamps are received at repetitive intervals.

12. The server of claim 9, wherein the route is superimposed on the map.

13. The server of claim 9, wherein the route is associated with a path that a consumer takes while traversing the store location.

14. The server of claim 13, wherein the route includes indicators corresponding to how long the consumer was at a specific position in response to the timestamps.

15. The server of claim 9, wherein the processor is further configured to provide the route and the map to a device that is not associated with the received waypoint data.

16. The server of claim 9, wherein the route module is configured to receive a position on the route where an item was lost.

17. A mobile computing device comprising:
    a map module configured to determine a store location of a retail store and receive a map corresponding to a layout of the retail store;
    a tracking module configured to receive waypoint data including a plurality of positions within the map and timestamps corresponding to the waypoint;
    a route module configured to determine a route in response to the waypoint data; and
    a graphical user interface configured to display the route and the map; and
    a processor configured to:
        determine a position of the plurality of positions that is selected by a customer, the position indicating a location where an item associated with the customer has been lost in the retail store, and
        transmit a notification including the position, the route, and the map to a computing device associated with the retail store to notify the retail store that the item has been lost.

18. The mobile computing device of claim 17, wherein the route module is further configured to determine the route by extrapolating data associated with the plurality of positions within the map and the corresponding timestamps to determine an estimated position.

19. The mobile computing device of claim 17, wherein the route is associated with a path that a mobile computing device takes while traversing the store location.

20. The mobile computing device of claim 17, wherein the graphical user interface is configured to receive a position on the route where an item was lost.

* * * * *